No. 692,195. Patented Jan. 28, 1902.
L. A. DÉSY.
MACHINE FOR UNRAVELING KNIT GOODS.
(Application filed June 23, 1898.)
(No Model.) 5 Sheets—Sheet 1.

Witnesses:
Horace G. Deitz

Louis Arsène Désy, Inventor
By Marion Marion
his Attorneys

No. 692,195. Patented Jan. 28, 1902.
L. A. DÉSY.
MACHINE FOR UNRAVELING KNIT GOODS.
(Application filed June 23, 1898.)
(No Model.) 5 Sheets—Sheet 3.

Witnesses:

Louis Arsène Désy, Inventor

By Marion Marion his Attorneys

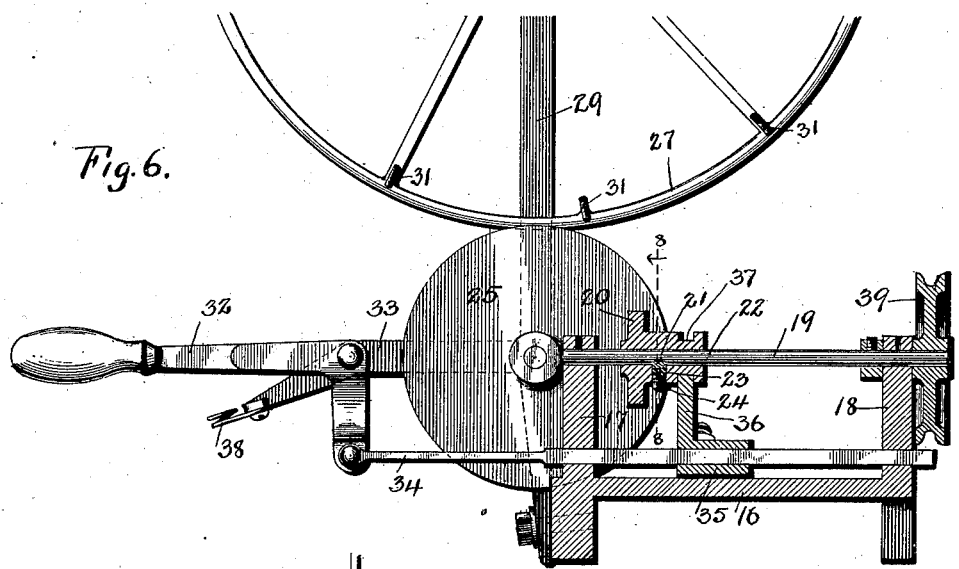

No. 692,195. Patented Jan. 28, 1902.
L. A. DÉSY.
MACHINE FOR UNRAVELING KNIT GOODS.
(Application filed June 23, 1898.)
(No Model.) 5 Sheets—Sheet 5.
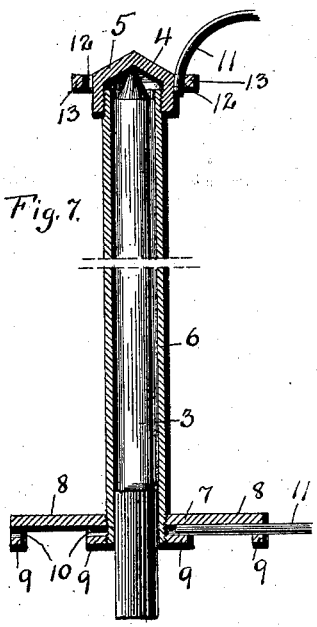
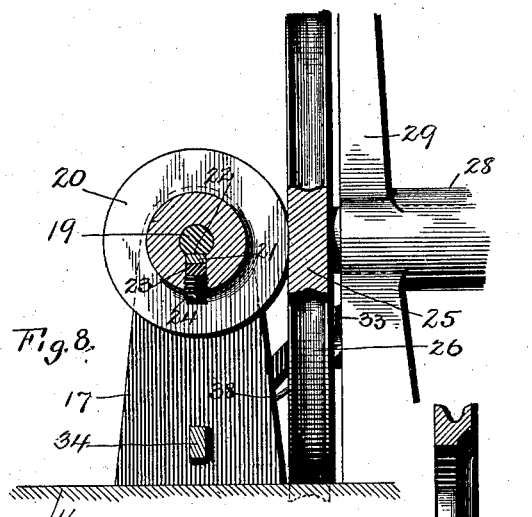
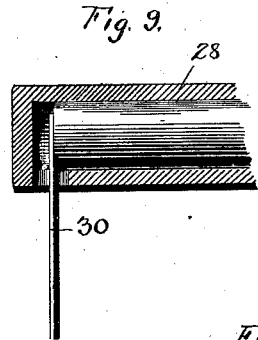
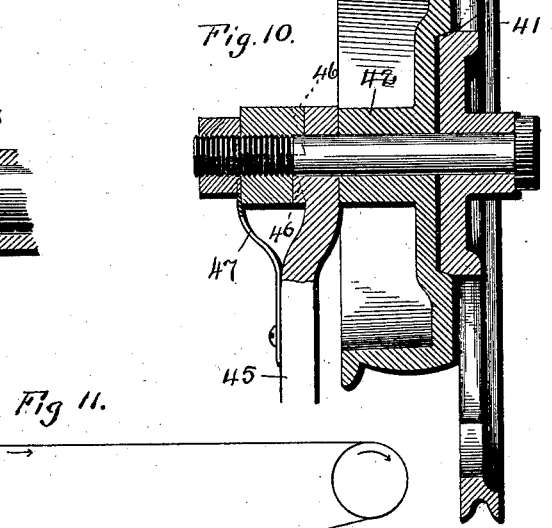
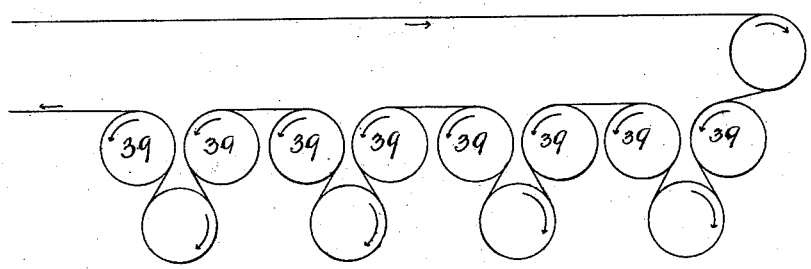
Louis Arsène Désy, Inventor

UNITED STATES PATENT OFFICE.

LOUIS ARSÈNE DÉSY, OF MONTREAL, CANADA, ASSIGNOR OF ONE-HALF TO MICHEL BENOIT, OF MONTREAL, CANADA.

MACHINE FOR UNRAVELING KNIT GOODS.

SPECIFICATION forming part of Letters Patent No. 692,195, dated January 28, 1902.

Application filed June 23, 1898. Serial No. 684,213. (No model.)

*To all whom it may concern:*

Be it known that I, LOUIS ARSÈNE DÉSY, a subject of Her Majesty the Queen of Great Britain, residing in the city and district of Montreal, Province of Quebec, Canada, have invented certain new and useful Improvements in Machines for Unraveling Knit Goods; and I do hereby declare the following to be a full, clear, and exact description of the invention, such as will enable others skilled in the art to which it appertains to make and use the same.

My invention relates to improvements in machines for unraveling knit goods.

The object of my invention is to provide a device of this character by means of which the threads composing the knitted portion can be readily unwound onto suitable reels.

A further object is to provide mechanism for varying the velocity of the reel, each reel having an independent mechanism.

A further object is to provide a holder for the knitted goods which will readily adapt itself to the size of the piece being unraveled.

To these ends my invention consists in the improved construction and combination of parts, as hereinafter fully described, and particularly pointed out in the appended claims.

Figure 1:
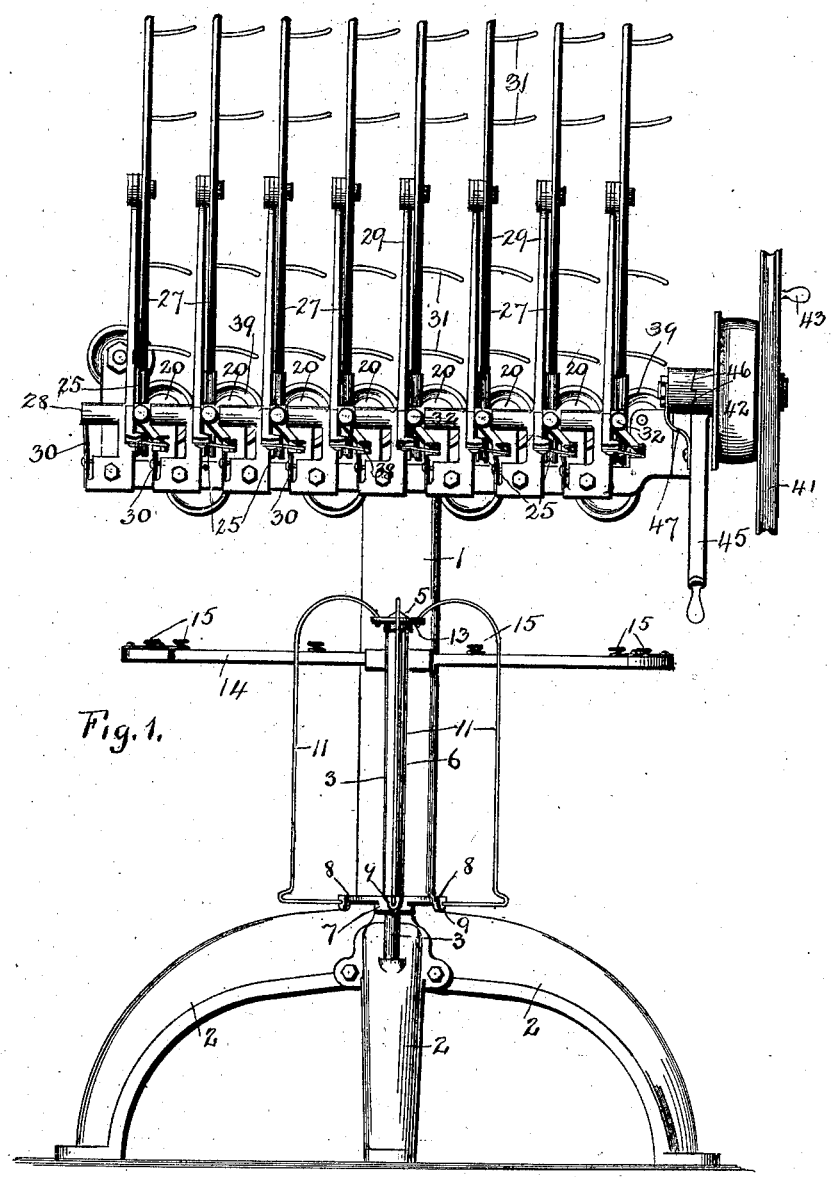
Figure 2:
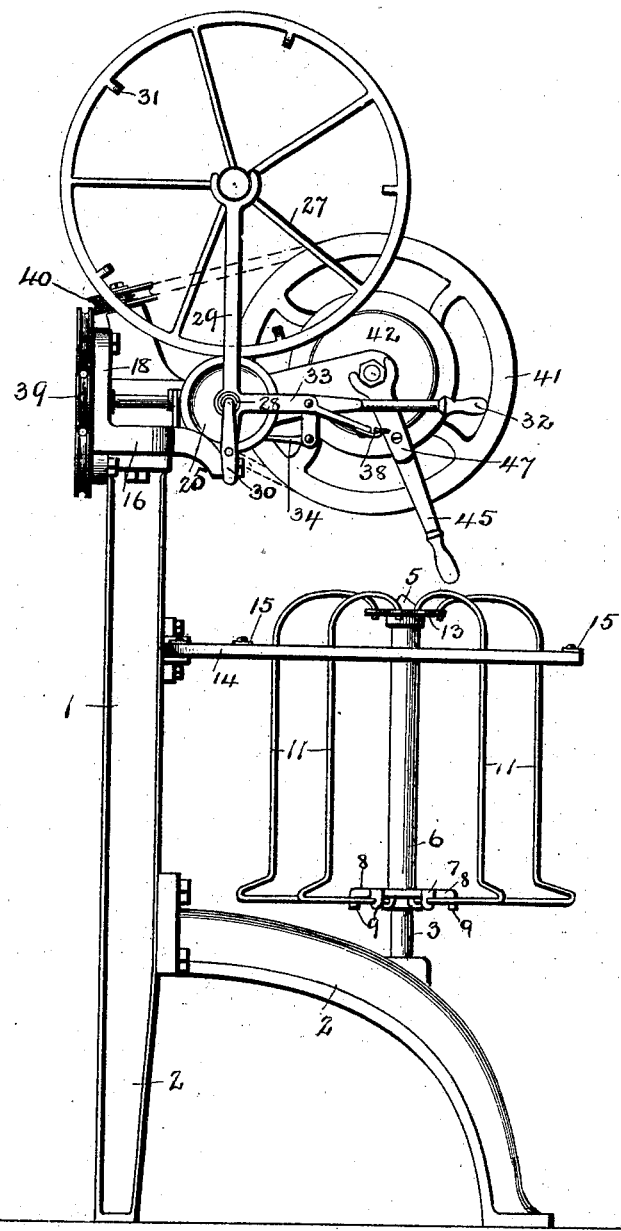
Figure 3:
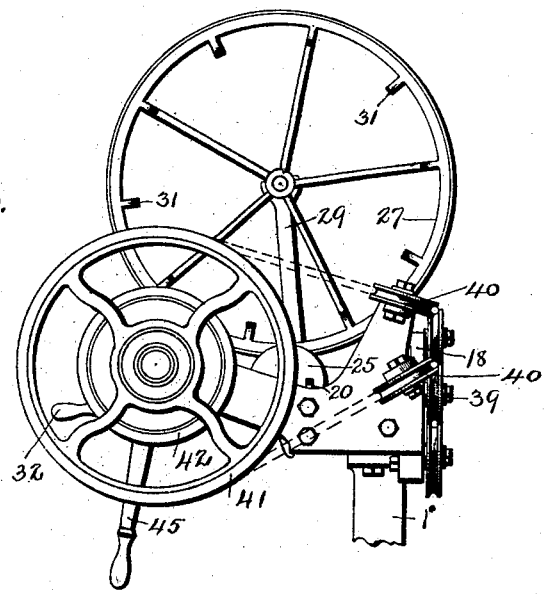
Figure 4:
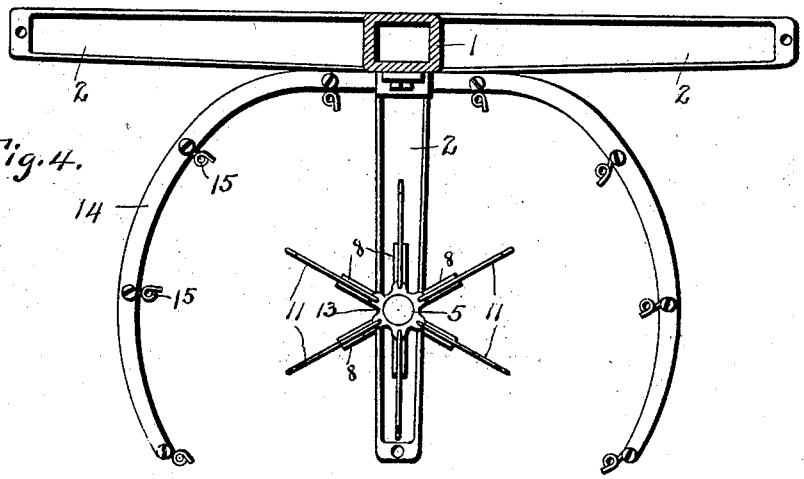

In the drawings, in which similar numerals of reference indicate similar parts in all of the views, Figure 1 is a front elevation of my improved machine. Fig. 2 is an end elevation of the same. Fig. 3 is an end elevation of the end opposite to that shown in Fig. 2. Fig. 4 is a horizontal sectional view showing the device for holding the knitted goods. Fig. 5 is a front elevation of a portion of the machine, showing the parts on an enlarged scale. Fig. 6 is a vertical transverse sectional view taken on the line 6 6 of Fig. 5. Fig. 7 is a sectional view of a portion of the knitted-goods carrier. Fig. 8 is a sectional view taken on the line of Fig. 6. Fig. 9 is a sectional view taken on the line 9 9 of Fig. 5. Fig. 10 is a sectional view of the clutch and its operating mechanism. Fig. 11 is a diagrammatic view showing the arrangement of the belt for operating the various reels.

It oftentimes happens during the knitting of tubular portions forming the main portion of underwear, &c., by machinery that by reason of the breaking of the thread and other causes, which are apparent to those who operate knitting-machines, portions of the knitted tube are cut out and generally thrown away as waste. The threads composing these knitted portions are capable of use in other portions; but such threads may be unraveled or unwound in order that they may be again placed on the bobbins ready for use. While several machines have been made to do this work, these machines all failed to properly unravel the threads by reason of the fact that in the knitting of goods the threads are used in unequal quantities, some threads being used to a greater extent than others. In the unraveling of goods of this kind it will be readily seen that to wind the thread properly the reels to contain such thread must take up the threads as fast as they are unraveled, and for this reason the reels must be capable of being rotated at varying speeds, which can be readily adjusted as may be found necessary by the operator of the machine. As the tubular knitted portions vary in size, it is desirable that the holder for these portions may be adjustable in order that fewer auxiliary parts are required for the machine. It is to provide a machine having these advantages and eliminating the disadvantages in machines of this character that I have prepared a construction such as shown in the drawings, as hereinafter described and claimed.

1 designates a standard, which is preferably mounted on legs 2, forming a tripod-mount such as shown in Fig. 4. The forwardly-extending leg 2 is provided with an upwardly-extending rod or shaft 3, having its upper end 4 conical-shaped, adapted to receive the cap 5 of a tubular casing 6, which casing is adapted to be placed on and have rotation about said shaft 3, as best shown in Fig. 7. The lower end of the casing 6 is provided with a collar 7, having radial arms 8, each of said arms having depending lugs 9, provided with openings 10. The openings 10 are adapted to receive one end of spring-rods 11, which rods are preferably bent in the manner shown in Figs. 1 and 2, the upper ends being adapted to be placed in suitable openings 12, formed in the flange 13, forming part of the cap 5. By this construction it will be seen that the rods 11 can be readily placed into or out of position and that the diameter of the knitted portion held by said rods can be varied by changing the position of the lower ends of the rods 11 in the openings 10. It will also be seen that the casing 6 will be readily rotated, inasmuch as there is practically no frictional resistance to its rotation, and thus eliminate all danger of the threads becoming broken by the tension of the operating parts.

Secured to the standard 1 is a semicircular frame 14, to the upper side of which are secured suitable eyes 15, through which the various threads composing the knitted portion are adapted to be passed onto the reels. If desired, the portion of the frame 14 may be varied vertically by placing suitable openings in the standard 1.

To the upper face of the standard 1 is secured a plate 16, extending lengthwise and adapted to support the mechanism now to be described, the number of mechanisms used being regulated by the number of threads being reeled. The plate 16 is provided with front and rear upwardly-extending portions 17 18, which portions are adapted to form bearings for the transverse shaft 19, one for each reel used. Mounted slidably on each shaft 19 is a frictional contact-roller 20, which roller is fixedly held to have a rotatory movement with said shaft by means of a block 21, held in contact with a cut-away portion 22, formed on the shaft 19, by means of a suitable resilient buffer 23, mounted between the block 21 and a set-screw 24. While the roller 20 will be held fixedly as regards its rotatory movement, yet it will be obvious that its position may be changed slidably on said shaft, the block 21 sliding in the cut-away portion 22. The roller 20 is adapted to contact with the face of a disk 25, which disk has its periphery provided with a groove 26, within which the rounded periphery of the reel 27 is adapted to be placed, the reel receiving the movement by frictional contact with the groove 26 of the disk 25. The disk 25 is pivotally mounted in a bearing 28, formed in an upright 29, which is removably secured to the front of the plate 16. The shaft of the disk 25 extends longitudinally in said bearing and has the end opposite to that containing the disk 25 adapted to be contacted by a suitable spring 30, connected to the upright 29. By this construction it will be seen that the disk 25 will be held tightly against the face of the contact-roller 20, from which it derives its movement regardless of the position the contact-roller 20 may be placed on the shaft 19. The reel 27 is removably mounted on the upright 29 and is provided with suitable thread-carrying pins 31. The position of the contact-roller 20 is regulated by the raising and lowering of a suitable handle 32, pivotally mounted on a forwardly-extending portion 33 of the upright 29, said handle being in the form of a bell-crank lever, the lower end of which is provided with a rearwardly-extending bar 34, which is provided with an adjustable collar 35, having an extension 36, adapted to be passed into an annular recess 37, formed on the roller 20. It will be obvious that a downward movement of the handle 32 will cause the bar 34 to be pushed rearwardly and that this movement of the bar will cause the contact-roller 20 to be moved rearwardly on the shaft 19 a corresponding distance and that an upward movement of the handle will cause these parts to move in an opposite direction. The extension 33 is provided with suitable eyes 38, through which the threads are adapted to pass onto the pins 31, the threads passing from the knitted portion upward through the eyes 15 to and through the eyes 38 and onto the pins 31. By this construction it will be readily seen that as the shaft 19, the rear end of which is provided with the grooved pulleys 39, is rotated the contact-roller 20 will coact with the face of the disk 25 and cause it to be rotated in its bearing 28 and that the reel 27, being in frictional contact with the disk 25, will receive a corresponding movement, which serves to wind the unraveled threads onto the pins 31. As hereinbefore explained, it is desirable that the speed of the reels be changed as desired, and inasmuch as the pulleys 39 are traveling at the same speed by reason of the construction shown in Fig. 11 the velocity of the disk 25 must be varied, and this is accomplished by means of the mechanism operated by the handle 32. As the contact-roller 20 is moved toward the center of the disk 25 the velocity of the disk will be increased in an obvious manner, while a movement in the opposite direction will cause a decrease in the velocity of the said disk. It will be seen that at all times the speed of the reel is under the control of the operator of the machine and that its speed can be regulated without stopping the machine, thus making it capable of minute adjustment at all times. When the reels have been filled with the threads, they are removed from the upright 29 and new reels inserted. The thread on the reels is then wound onto bobbins and is ready for further use.

To drive the various pulleys 39 so that the reels may each be rotated in the same direction, I have provided the arrangement shown in Fig. 11, which is a diagrammatic view of the arrangement of pulleys and the belt which operates them, taken from the rear of the machine. The belt is carried over the inclined pulley 40, formed at the end of the machine, it passing over a suitable drive-pulley 41, which is driven by a belt passing over the pulley 42. The machine may also be operated by hand by means of a suitable handle 43, mounted on the pulley 41. The pulley 42 is preferably a loose pulley mounted on the shaft of the pulley 41 and is adapted to be thrown into engagement with a flange 44, formed on the pulley 41, by the movement of a suitable lever 45, mounted on the shaft of the pulley 41, said lever being provided with inclined faces 46, which are adapted to ride on similar faces formed on a collar mounted on the shaft of the pulley 41. A spring 47 serves to prevent the lever 45 from being accidentally displaced when rotated to a position to form the contact of the pulley 42 with the pulley 41. The advantages of this construction are many and include the ability to control the entire movement of the machine, the ability to vary the velocity of each reel as may be desired, and also the ease with which the device will unravel the threads from the knitted goods.

While I have shown and described the contact-roller 20 as provided with a retaining-stop of a specified form, it will readily be understood that I may form the connection between the shaft 19 and the roller 20 by any suitable construction, such as a feather and spline, if such construction is found desirable.

Having thus described my invention, what I claim as new is—

1. A machine for unraveling knit goods comprising a standard; a pivoted support for the knit goods mounted on said standard; a series of reels mounted on said standard, said reels being independently operated to receive the individual threads from said knit goods, and means for rotating said reels with individual varying velocity, substantially as described.

2. A machine for unraveling knit goods comprising a standard; a support for the knit goods pivotally mounted on said standard; a series of reels mounted on said standard, each reel being independently operated, each of said reels being adapted to receive an independent thread of said knit goods; means for rotating said reels; and means for regulating the velocity of each of said reels independently, substantially as described.

3. A machine for unraveling knit goods comprising a revoluble knit-goods support, a series of revoluble reels each adapted to receive an independent thread from knit goods on said support, and a plurality of individually-regulatable devices in operative relation to the series of reels for driving the latter at optionally-variable speeds, as set forth.

4. A machine for unraveling knit goods comprising an idly-revoluble knit-goods support, a series of independently-mounted reels each adapted to receive a separate thread from knit goods on said support, a series of shafts each adjacent to one of said reels, gearing between the shafts and the reels, and a common driving connection for the series of shafts, substantially as described.

5. A machine for unraveling knit goods comprising a revoluble knit-goods support, a series of independently-mounted reels each adapted to receive a separate thread from knit goods on said support, a series of shafts, gearing between the shafts and the reels, means for shifting the position of one of the two elements of the gear between each reel and one of said shafts, and means for simultaneously driving the shafts, substantially as described.

6. A machine for unraveling knit goods comprising a standard; a support for the knit goods pivotally mounted thereon; a series of reels pivotally mounted on said standard, each of said reels being adapted to receive an independent thread of said knit goods; means for operating each of said reels; and connections located between said reels and said operating means for varying the velocity of each of said reels, said connections being capable of being regulated during the movement of the machine, substantially as described.

7. A machine for unraveling knit goods comprising a standard; a support for the knit goods pivotally mounted thereon; a series of reels pivotally mounted on said standard, each of said reels being adapted to receive an independent thread of said knit goods; means for operating each of said reels, and connections adjustably located between said reels and said operating means for varying the velocity of each of said reels, said means being capable of being regulated during the movement of the machine, substantially as described.

8. A machine for unraveling knit goods comprising a standard; a support for the knit goods pivotally mounted thereon; a series of reels independently operated, pivotally mounted on said standard, each of said reels being adapted to receive an independent thread of said knit goods; means for operating each of said reels; and connections located between each of said reels and said operating means for varying the velocity of each of said reels, substantially as described.

9. A machine for unraveling knit goods comprising a standard; a support for the knit goods pivotally mounted thereon; a series of reels independently operated, pivotally mounted on said standard, each of said reels being adapted to receive an independent thread of said knit goods; a driving mechanism for each reel, and means for adjusting each driving mechanism during the operation thereof, to effect a variation in the speed of the reel without involving stoppage of the machine, substantially as described.

10. A machine for unraveling knit goods comprising a standard; a support for the knit goods pivotally mounted thereon; a series of reels pivotally mounted on said standard, each of said reels being adapted to receive an independent thread of said knit goods; a drive-shaft for each of said reels; means for rotating each of said drive-shafts; connections between said drive-shafts and said reels for imparting movement to said reels; and means for altering the position of said connections, whereby the velocity of said reels may be varied, substantially as described.

11. A machine for unraveling knit goods comprising a standard; a support for the knit goods pivotally mounted thereon; a series of reels pivotally mounted on said standard, each of said reels being adapted to receive an independent thread of said knit goods; a drive-shaft for each of said reels; means for rotating each of said drive-shafts; connections between said drive-shafts and said reels for imparting movement to said reels; and independently-operable levers in operative relation to said connections to vary the speed of the reel without involving stoppage thereof, substantially as described.

12. A machine for unraveling knit goods comprising a standard; a support for the knit goods pivotally mounted thereon; a series of reels pivotally mounted on said standard, each of said reels being adapted to receive an independent thread of said knit goods; a drive-shaft for each of said reels; means for rotating each of said drive-shafts; connections between said drive-shafts and said reels for imparting movement to said reels; and means for altering the position of said connections, each reel having an independent means, whereby the velocity of each of said reels may be independently varied, substantially as set forth.

13. A machine for unraveling knit goods comprising a standard; a support for the knit goods pivotally mounted thereon; a series of reels pivotally mounted on said standard, each of said reels being adapted to receive an independent thread of said knit goods, a drive-shaft for each of said reels, a common driving connection for rotating all of said drive-shafts; friction-gearing between the drive-shafts and the reels for imparting movement to the latter, and means for changing the relation of the members of the friction-gearing between each reel and its respective drive-shaft, whereby the speed of the reels may be varied independently, substantially as described.

14. A machine for unraveling knit goods comprising a standard; a support for the knit goods pivotally mounted thereon; a series of reels pivotally mounted on said standard, each reel being adapted to receive the thread of said knit goods; disks mounted on said standard and contacting with said reels; a series of drive-shafts mounted on said standard; means for rotating said drive-shafts; connections between said drive-shafts and said disks, whereby the rotatory movement of said drive-shafts will be imparted to said disks; and means for adjusting the position of said connections, substantially as described.

15. A machine for unraveling knit goods comprising a standard; a support for the knit goods pivotally mounted thereon; a series of reels pivotally mounted on said standard, each of said reels being adapted to receive an independent thread of said knit goods; a series of disks independently operated, mounted on said standard and having contact with said reels; a series of drive-shafts mounted on said standard; means for rotating said drive-shafts; a roller slidably mounted on each of said drive-shafts, each of said rollers engaging with the face of its corresponding disk; and means for varying the position of said rollers, substantially as described.

16. A machine for unraveling knit goods comprising a standard; a support for the knit goods pivotally mounted thereon; a series of reels pivotally mounted on said standard, each of said reels being adapted to receive an independent thread of said knit goods; a series of disks independently operated, mounted on said standard and having contact with said reels; a series of drive-shafts mounted on said standard; means for rotating said drive-shafts; a roller slidably mounted on each of said drive-shafts, each of said rollers engaging with the face of its corresponding disk; and means for varying the position of said rollers, each of said rollers having an independent means, substantially as described.

17. A machine for unraveling knit goods comprising a standard; a support for the knit goods pivotally mounted thereon; a series of reels pivotally mounted thereon; a series of reels pivotally mounted on said standard, each of said reels being adapted to receive an independent thread of said knit goods; a series of disks independently operated, mounted on said standard and having contact with said reels; a series of drive-shafts mounted on said standard; means for rotating said drive-shafts; a roller slidably mounted on each of said drive-shafts, each of said rollers engaging with the face of its corresponding disk; a series of handles mounted on said standard; and connections between said handles and said rollers, whereby said rollers may be adjusted to alter the velocity of said disks, substantially as described.

18. A machine for unraveling knit goods comprising a standard; a support for the knit goods pivotally mounted thereon; a series of reels pivotally mounted thereon; a series of reels pivotally mounted on said standard, each of said reels being adapted to receive an independent thread of said knit goods; a series of disks independently operated, mounted on said standard and having contact with said reels; a series of drive-shafts mounted on said standard; means for rotating said drive-shafts; a roller slidably mounted on each of said drive-shafts, each of said rollers engaging with the face of its corresponding disk; a series of handles pivotally mounted on said standard; each reel having an independent handle; and connections between each of said handles and its corresponding roller, whereby the position of each of said rollers may be independently adjusted to alter the velocity of their respective disks, substantially as described.

In witness whereof I have hereunto set my hand in the presence of two witnesses.

LOUIS ARSÈNE DÉSY.

Witnesses:
J. A. MARION,
HORACE G. SEITZ.